United States Patent
Balczun et al.

[11] Patent Number: 5,902,050
[45] Date of Patent: May 11, 1999

[54] SPHERICAL ELASTOMERIC BEARING ASSEMBLY

[75] Inventors: Paul J. Balczun, Erie, Pa.; Paul L. Becotte, Plantsville; Randall L. Solomon, Southington, both of Conn.

[73] Assignees: Lord Corporation, Cary, N.C.; Alinabal, Inc., Milford, Conn.

[21] Appl. No.: 08/657,851

[22] Filed: May 31, 1996

[51] Int. Cl.$^6$ .............. F16C 23/04; F16C 27/06
[52] U.S. Cl. .......... 384/206; 384/220; 384/203; 384/215; 267/141
[58] Field of Search .................. 384/206, 208, 384/213, 214, 220, 202, 203, 215, 221; 267/141, 140.11, 293

[56] References Cited

U.S. PATENT DOCUMENTS

| | | | |
|---|---|---|---|
| 1,913,513 | 11/1933 | Rossman et al. | 384/215 X |
| 1,989,116 | 1/1935 | Strauss | 287/90 |
| 1,990,016 | 2/1935 | Alden et al. | 287/85 |
| 2,258,040 | 10/1941 | Young | 308/26 |
| 2,367,832 | 1/1945 | Riesing | 308/26 |
| 2,432,050 | 11/1947 | Thiry | 267/140.11 |
| 2,856,203 | 10/1958 | Kayler | 280/440 |
| 3,163,475 | 12/1964 | Litsky | 384/206 |
| 3,297,223 | 1/1967 | Bueker | 226/183 |
| 3,322,474 | 5/1967 | Destival | 308/26 |
| 3,398,700 | 8/1968 | Baker | 105/182 |
| 3,428,374 | 2/1969 | Orkin et al. | 384/213 |
| 3,528,712 | 9/1970 | Vacca et al. | 308/26 |
| 3,744,859 | 7/1973 | Ringel | 384/206 |
| 3,904,300 | 9/1975 | Hetmann | 267/293 X |
| 3,923,349 | 12/1975 | Herbst | 308/26 |
| 4,007,924 | 2/1977 | Jorn et al. | 267/57.1 R |
| 4,034,996 | 7/1977 | Manita et al. | 280/80 R |
| 4,129,394 | 12/1978 | Eichinger et al. | 403/57 |
| 4,158,511 | 6/1979 | Herbenar | 403/113 |
| 4,232,563 | 11/1980 | Peterson et al. | 74/470 |
| 4,971,285 | 11/1990 | Bechu . | |
| 5,031,545 | 7/1991 | Bourgeot | 105/199.1 |
| 5,033,722 | 7/1991 | Lammers | 384/221 X |
| 5,058,867 | 10/1991 | Hadano et al. | 384/203 X |
| 5,178,482 | 1/1993 | Wood . | |
| 5,193,787 | 3/1993 | Coopland, Jr. | 267/220 |
| 5,265,495 | 11/1993 | Bung et al. . | |
| 5,340,220 | 8/1994 | Sprang et al. | 384/202 X |
| 5,342,128 | 8/1994 | Gruber | 384/203 |
| 5,364,191 | 11/1994 | Gruber | 384/206 X |
| 5,431,540 | 7/1995 | Doolin et al. | 416/168 R |

FOREIGN PATENT DOCUMENTS

| | | | |
|---|---|---|---|
| 247124 | 1/1960 | Australia | 384/203 |
| 0 553 565 A2 | 8/1993 | European Pat. Off. . | |
| 1.412.786 | 1/1966 | France . | |
| 41 02 863 | 6/1992 | Germany . | |
| 0 570 625 A2 | 11/1993 | Germany . | |
| 616938 | 1/1949 | United Kingdom . | |
| 1 360 515 | 7/1974 | United Kingdom . | |
| 2275743 | 9/1994 | United Kingdom . | |

*Primary Examiner*—Daniel P. Stodola
*Assistant Examiner*—Gregory J. Strimbu
*Attorney, Agent, or Firm*—Randall S. Wayland; Richard K. Thomson

[57] ABSTRACT

A spherical bearing used in a rod end housing is modified with an elastomeric member equally precompressed in an amount of about 30% of an unstressed thickness of the elastomeric member to isolate the transmission of vibrations and sound. Such spherical elastomeric bearings can be used in any application where a conventional spherical bearing is used such as cable connections, clutch linkages, etc., in trucks, farm tractors, and various other pieces of equipment.

4 Claims, 4 Drawing Sheets

SPHERICAL ELASTOMERIC BEARING ASSEMBLY

BACKGROUND AND SUMMARY OF THE INVENTION

The present invention is directed to the field of spherical bearings. More particularly this invention is directed to an improved spherical bearing which incorporates an elastomeric member to provide isolation of transmitted vibrations.

Spherical rod ends, that is, rod ends having spherical bearings, are widely used to make various connections including control cables and clutch linkages in class 8 trucks, farm tractors, off highway vehicles and other types of equipment. Such rod ends typically comprise a spherical bearing (a first metal element with an external spherical configuration and a second metal element with a complementary internal spherical surface with a Teflon® coating or a similarly configured plastic element) in a housing. The housing has i) a cylindrical opening that receives the spherical bearing and ii) a radially extending stud that typically has an internal thread that can be directly threaded onto the end of a cable, or the like. The first outer metal element can be retained in the housing by press fit or other mechanical connection such as staking, or the like. The second inner metallic element of the spherical bearing can be bolted to a bracket or other connector and the pivotability of the spherical bearing permits misalignment and movement of the cable relative to the connector, as needed.

A particular problem with such rod ends is that this rigid construction forms a linking path for the transmission of vibration, some of which takes the form of sound energy, i.e., noise. As efforts are made to make the cabs of these trucks, tractors and off-highway vehicles quieter, something must be done to isolate these transmission paths. The present invention proposes to bond an elastomeric layer to at least one of the inner and outer elements to interrupt (isolate) this direct transmission path. The elastomer may be natural rubber, neoprene, silicon elastomer, fluorocarbon elastomer, EPDM, SBR, PBR or blends thereof. Further, high temperature applications may require the use of other elastomers such as Viton® polymer, for example. In one embodiment, the elastomer is positioned between the inner and outer elements and bonded to both. In yet another embodiment, the spherical ring inner element is replaced with an elongated stud having a spherical head portion. The opposing end of the stud is externally threaded for bolting through a connector.

Various other features, advantages and characteristics of the present invention will become apparent after a reading of the following detailed description of the preferred embodiments.

BRIEF DESCRIPTION OF THE DRAWINGS

The present invention is described in conjunction with the following figures, like reference numerals describe like parts, in which.

DETAILED DESCRIPTION OF THE PREFERRED EMBODIMENTS

Figure 1A:
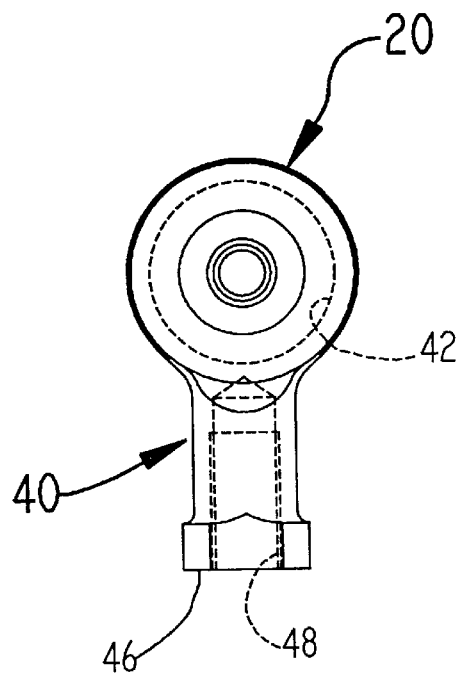
FIG. 1A is front view of a first preferred embodiment of the present invention.
Figure 1B:
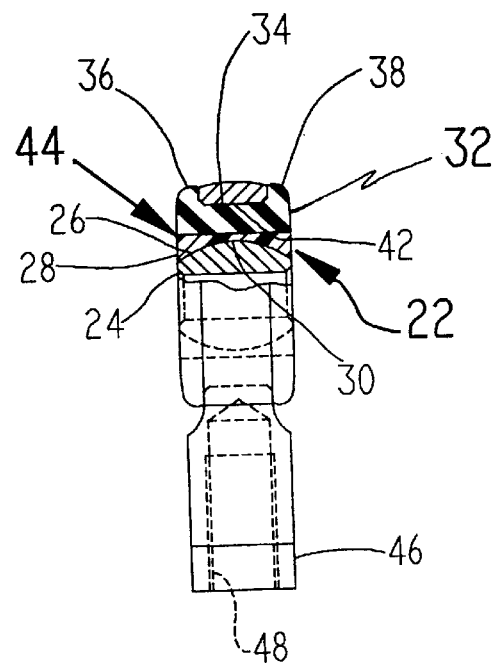
FIG. 1B is a side view in partial cross section of the first embodiment.

A first embodiment of the spherical rod end of the present invention is shown in FIGS. 1A and 1B generally at 20. A spherical bearing 22 includes an inner element 24 which is preferably metallic, having an outer spherical surface 26 and a cylindrical outer element 28 which is preferably plastic, having a complimentarily formed inner surface 30 which pivotally receives inner element 24. Typically the outer element 28 will be made of a glass-filled nylon material. Alternatively, element 28 may be substantially metallic with a Nylatron coating on the surface which engages element 24. Preferably, the spherical bearing 22 is of the type identified as PLS-10-G available from Alinabal, Millford, Conn., although other bearings could be used.

A wheel-shaped elastomeric member 32 is bonded to the exterior of outer element 28. The elastomer of member 32 may be natural rubber, neoprene, fluorocarbon elastomer, EPDM, SBR, PBR or blends thereof. Further, high temperature applications may require the use of other elastomers such as silicon elastomer or Viton® elastomer. Member 32 has an external surface portion 34 which is generally cylindrical and a pair of flanges 36 and 38 which extend radially outwardly therefrom. Rod end housing 40 has a cylindrical opening 42 which will typically be of a diameter which is slightly smaller than that of surface portion 34. Indeed, it is preferred that the elastomer of member 32 be precompressed by opening 42 by an amount equal to 30% of the thickness of the elastomer. Precompression of at least 5% extends the useful life of the elastomer. The bearing assembly 44 (bearing 22 with the elastomeric member 32 bonded thereto) is press fit into opening 42. Flanges 36 and 38 extend on either side of the opening 42 and serve to retain the bearing assembly 44 in opening 42.

The end 46 of rod end housing 40 opposite the end with opening 42, has a tapped bore 48 that may be threaded directly on the end of a control cable, clutch linkage or the like. It will be appreciated that an externally threaded stud could replace tapped bore 48. The other end which houses the bearing assembly 44 can be bolted to a bracket or other connector (not shown). Inner element 24 can preferably pivot relative to outer element 28 by an amount equal to at least 15° in any direction; that is, a central axis of inner element 24 can pivot through a conic inclusive angle of 30° relative to the central axis of the outer element 28 to permit misalignment and movement, if needed, as in the case of a clutch linkage, for example. The elastomer of member 32 will prevent the transmission of vibration across member 32 from the cables or linkage into the cab of the vehicle. As noted earlier, this vibration may be in the audible range and form part of the background noise. It will do little good to provide isolation mounts for the engine, use passive sound damping means in the walls and floors of the cab, if there are hardline connections through which sound can migrate into the cab. The spherical rod end 22 of the present invention halts this migration.

Figure 2A:
FIG. 2A is a cross-sectional side detail view of second embodiment of an elastomeric bearing assembly before it is installed in its housing.
Figure 2B:
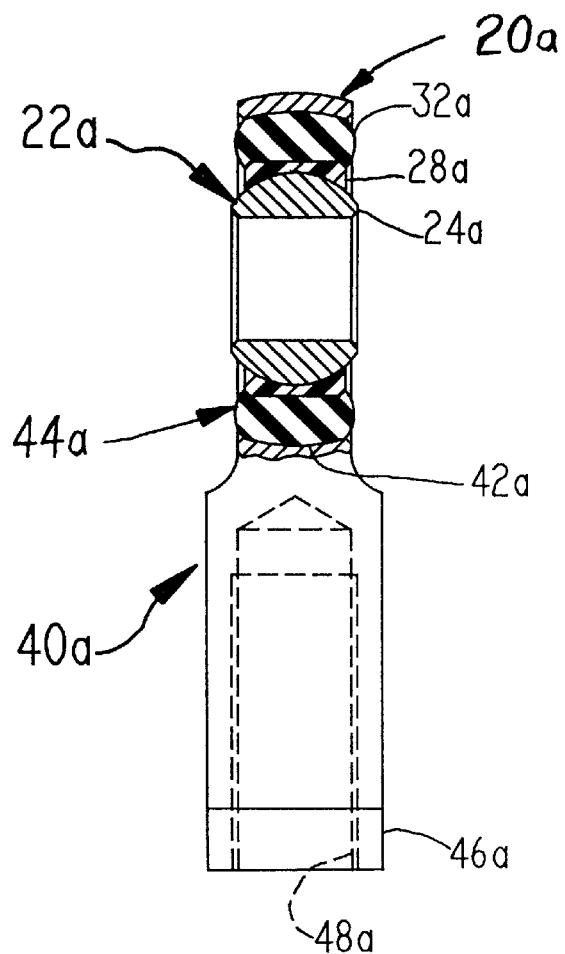
FIG. 2B is a side view in partial section of the second embodiment.

A second embodiment of the present invention is depicted in FIGS. 2A and 2B generally at 20a. The bearing 22a is identical in all respects to that of the first embodiment including elements 24a and 28a and rod end 46a and bore 48a. In this embodiment, the configuration of elastomeric member 32a and the opening 42a in housing 40a is configured slightly differently. Elastomeric member 32a is trapezoidal in cross section, tapering outwardly. Opening 42a is generally cylindrical but has a slight radius on it front to back which assists in bearing assembly retention. Bearing assembly 44a is press fit into opening 42a and retained by the front-to-back radiusing. This configuration may be suitable for some applications. However, where ever the rod end experiences any loading along the central axis of bearing 22a, the embodiment of FIGS. 1A and 1B is preferred.

Figure 3A:
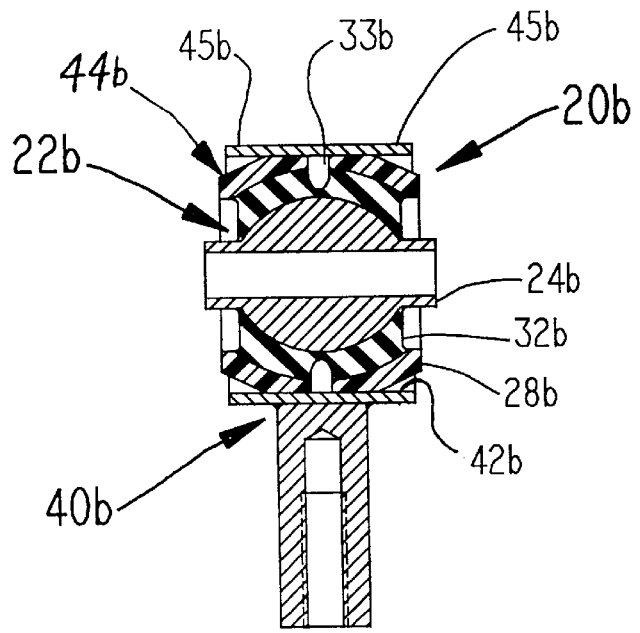
FIG. 3A is a cross-sectional side view of a third embodiment of the present invention shown partially assembled.
Figure 3B:
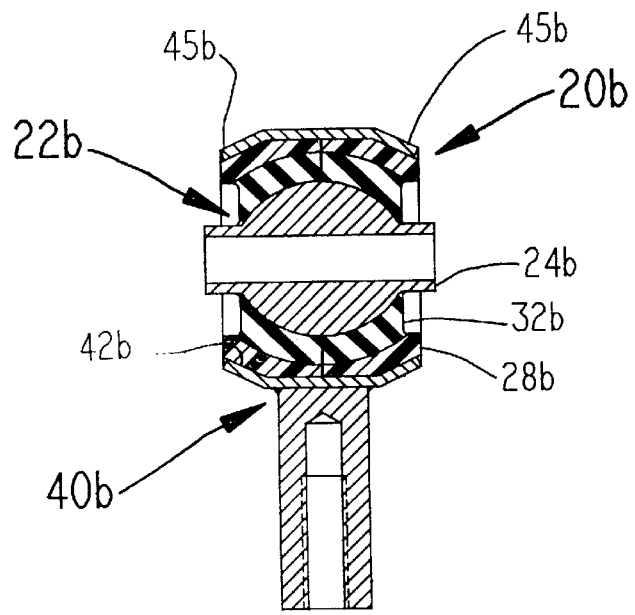
FIG. 3B is a cross-sectional side view of the third embodiment in its fully assembled condition.

A third embodiment is shown in FIGS. 3A and 3B generally at 20b. In this embodiment, elastomeric bearing 32b has a generally spherical external surface and is positioned between and bonded to both the inner metallic element 24b and outer plastic element 28b. The elastomer of bearing 32b has an annular groove or gap 33b formed therein and outer element 28b is formed as two spaced members. As shown in FIG. 3A, opening 42b in rod end housing 40b is cylindrical. Once the elastomeric bearing assembly 44b, including spherical bearing 22b, is installed into opening 42b, the edges 45b are crimped to retain the bearing assembly 44b in housing 40b. As shown in FIG. 3b, gap 33b closes up following crimping. The reason for having gap 33b is to relieve tension stresses in the elastomer caused by thermal shrinkage after bonding. The gap 33b provides a relief space into which the elastomer displaced by precompression can flow. In this embodiment, the angular misalignment permitted by the elastomeric bearing 22b will occur as a result of the flexing of the elastomer. It will be recalled that this misalignment is at least ±15° from horizontal.

Figure 4:
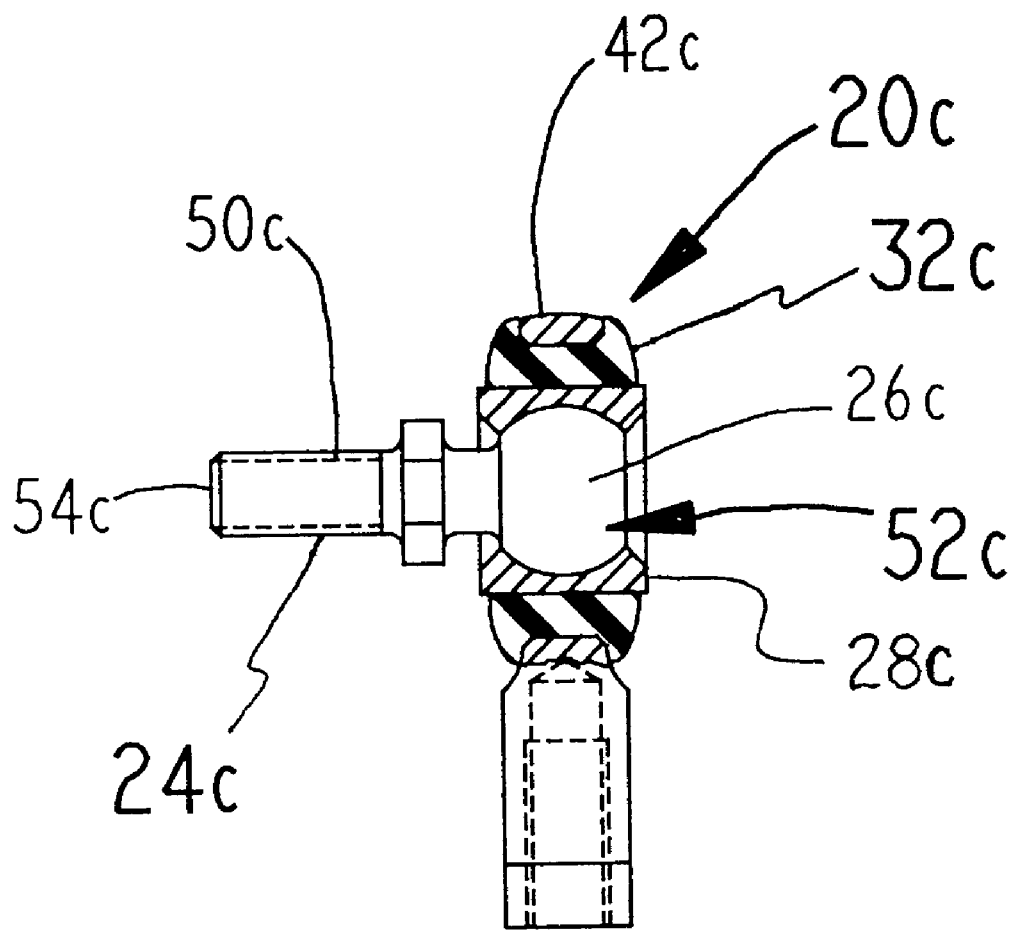
FIG. 4 is a cross-sectional side view of a fourth embodiment of the present invention.

FIG. 4 shows yet a fourth embodiment generally at 20c. In this embodiment, the inner element 24c takes the form of a stud 50c with the spherical surface 26c being formed on the surface of a head portion 52c. The opposite end 54c of stud 50c is threaded for being bolted to a surface or through a connector by threading a nut onto threaded end 54c. Elastomeric member 32c is positioned between outer element 28c and opening 42c. This embodiment is considered to be the preferred embodiment of the present invention. Stud 50c can pivot by the abovementioned minimum ±15° and, in fact, for certain applications, can be provided with angular freedom of up to ±25°. It will be appreciated that although this embodiment shows an external thread configuration, an internal thread could be used instead in end 54c by enlarging the diameter of the end 54c to roughly the diameter of the flange.

Various changes, alternatives and modifications will become apparent to a person of ordinary skill in the art following a reading of the foregoing detailed description. It is intended that all such changes, alternatives and modifications as fall within the scope of the appending claims be considered part of the present invention.

What is claimed is:
1. A spherical rod end, comprising:
 a) a rod end including
  i) a generally cylindrical rod end housing which has a first generally cylindrical portion with a first longitudinal axis and a first generally cylindrical opening in said first generally cylindrical portion defining an inner surface of said first generally cylindrical portion, and
  ii) a second elongated cylindrical portion integral with said first generally cylindrical portion, said second elongated cylindrical portion having a second longitudinal axis perpendicular to said first longitudinal axis and a threaded portion which is directly attachable to a complementarily threaded element;
 b) a spherical bearing subassembly, including:
  i) an inner element having a generally spherical external surface and an axial through bore, and
  ii) a unitary plastic intermediate element having a generally spherical inner surface which receives said generally spherical external surface of said inner element for pivotal movement therewith, said intermediate element including a generally cylindrical external surface; and
 c) a unitary elastomeric member which surrounds said intermediate element and is bonded to said generally cylindrical external surface of said intermediate element, said unitary elastomeric member having an external surface portion having a generally cylindrical shape which is press fit into said first generally cylindrical opening, said external surface portion of said elastomeric member contacting said inner surface of said first generally cylindrical portion such that said unitary elastomeric member is equally precompressed about a periphery of said external surface portion of said elastomeric member in an amount of about 30% of an unstressed thickness of said unitary elastomeric member, and a pair of flanges extending radially outwardly on both sides of the first generally cylindrical opening beyond both a radial extent of said external surface portion of said elastomeric member and a radial extent of said first generally cylindrical opening in said housing to capture said spherical bearing subassembly within said generally cylindrical rod end housing;
wherein said subassembly is received in and retained by said first generally cylindrical opening of said housing and said unitary elastomeric member reduces transmission of vibrations to and from said rod end housing from and to said inner element.

2. A spherical rod end, comprising:
 a) a rod end including
  i) a generally cylindrical rod end housing which has a first generally cylindrical portion with a first longitudinal axis and a generally cylindrical opening in said first generally cylindrical portion defining an inner surface of said first generally cylindrical portion, said cylindrical rod end housing including first and second end portions, and
  ii) a second elongated cylindrical portion integral with said first generally cylindrical portion, said second elongated cylindrical portion having a second longitudinal axis perpendicular to said first longitudinal axis and a threaded portion which is directly attachable to a complementarily threaded element;
 b) a spherical bearing subassembly, including:
  i) an inner element having a generally spherical external surface and an axial through bore, and
  ii) first and second plastic intermediate element halves, each of said halves having a generally spherical inner surface, a generally cylindrical external surface, and an axial end portion; and
 c) an elastomeric member bonded to said generally spherical inner surface of said first and second plastic intermediate element halves and to said generally spherical external surface of said inner element, said elastomeric member including a centrally located gap positioned adjacent to said axial end portion of said first and second halves;
wherein said spherical bearing subassembly is retained in said generally cylindrical opening by crimping of said first and second end portions of said cylindrical rod end housing which closes said gap, said elastomeric member being uniformly preloaded by an amount of about 30% of an unstressed thickness of said elastomeric member, and wherein said elastomeric member reduces transmission of vibrations between said rod end housing and said inner element.

3. A spherical rod end, comprising:

a) a rod end including;
   i) a generally cylindrical rod end housing having a first generally cylindrical portion with a first longitudinal axis and a first generally cylindrical opening in said first generally cylindrical portion defining an inner surface of said first generally cylindrical portion, and
   ii) a second elongated cylindrical portion integral with said first generally cylindrical portion, said second elongated cylindrical portion having a second longitudinal axis perpendicular to said first longitudinal axis and a threaded portion which is directly attachable to a complementarily threaded element;

b) a spherical bearing subassembly, including;
   i) an elongated stud having a head portion with a generally spherical external surface and having a threaded surface portion remote from said head portion; and
   ii) a unitary intermediate element having a generally spherical inner surface which receives said generally spherical external surface of said head portion for pivotal movement therewith, said intermediate element including a generally cylindrical external surface; and c) a unitary elastomeric member which surrounds said intermediate element and is bonded to said generally cylindrical external surface of said intermediate element, said unitary elastomeric member having a generally cylindrical external surface portion which is press fit into said first generally cylindrical opening, said external surface portion of said elastomeric member contacting said inner surface of said first generally cylindrical portion such that said unitary elastomeric member is equally precompressed about a periphery of said external surface portion of said elastomeric member in an amount of about 30% of an unstressed thickness of said unitary elastomeric member, and a pair of flanges extending radially outwardly on both sides of said first generally cylindrical opening beyond both a radial extent of said external surface portion of said unitary elastomeric member and a radial extent of said first generally cylindrical opening in said housing to capture said spherical bearing subassembly within said generally cylindrical rod end housing; wherein said subassembly is received in and retained by said first generally cylindrical opening of said housing and said unitary elastomeric member reduces transmission of vibrations to and from said rod end housing from and to said elongated stud.

4. A spherical rod end, comprising:

a) a rod end including:
   i) a generally cylindrical rod end housing having a first generally cylindrical portion with a first longitudinal axis and a first generally cylindrical opening in said first generally cylindrical portion defining an inner surface of said first generally cylindrical portion, and
   ii) a second elongated cylindrical portion integral with said first generally cylindrical portion, said second elongated cylindrical portion having a second longitudinal axis perpendicular to said first longitudinal axis and a threaded portion which is directly attachable to a complementarily threaded element;

b) a spherical bearing subassembly, including:
   ii) an inner element having a generally spherical external surface and an axial through bore, and
   ii) a unitary plastic intermediate element having a generally spherical inner surface which receives said generally spherical external surface of said inner element for pivotal movement therewith, said intermediate element including a generally cylindrical external surface; and c) a unitary elastomeric member which surrounds said intermediate element and is bonded to said generally cylindrical external surface of said intermediate element, said unitary elastomeric member having a trapezoidal cross sectional shape when in an unstressed condition and including a generally cylindrical external surface portion, said unitary elastomeric member being press fit into said first generally cylindrical opening, said external surface portion of said elastomeric member contacting said inner surface of said first generally cylindrical portion such that said unitary elastomeric member is equally precompressed about a periphery of said external surface portion of said elastomeric member in an amount of about 30% of an unstressed thickness of said unitary elastomeric member;

wherein said subassembly is received in and retained by said first generally cylindrical opening of said housing and said unitary elastomeric member reduces transmission of vibrations to and from said rod end housing from and to said inner element.

* * * * *